(12) United States Patent  
Gatmir-Motahari et al.

(10) Patent No.: US 9,154,970 B1
(45) Date of Patent: Oct. 6, 2015

(54) HIDDEN WIRELESS USER ESTIMATION BASED ON WIRELESS NETWORK USAGE DATA

(71) Applicant: Sprint Communications Company L.P., Overland Park, KS (US)

(72) Inventors: Sara Gatmir-Motahari, Millbrae, CA (US); Kosol Jintaseranee, Millbrae, CA (US); Hui Zang, Cupertino, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 207 days.

(21) Appl. No.: 13/680,428

(22) Filed: Nov. 19, 2012

(51) Int. Cl.
*H04M 11/00* (2006.01)
*H04W 24/00* (2009.01)

(52) U.S. Cl.
CPC .................................... *H04W 24/00* (2013.01)

(58) Field of Classification Search
CPC ...................................................... H04W 24/00
USPC ........................................................ 455/405
See application file for complete search history.

(56) References Cited

U.S. PATENT DOCUMENTS

| | | | |
|---|---|---|---|
| 8,014,378 B1* | 9/2011 | Yoon et al. | 370/350 |
| 2005/0286440 A1* | 12/2005 | Strutt et al. | 370/253 |
| 2011/0265109 A1* | 10/2011 | Goyet et al. | 725/9 |
| 2012/0163225 A1* | 6/2012 | Mishkin et al. | 370/252 |
| 2012/0172062 A1* | 7/2012 | Altman et al. | 455/457 |
| 2013/0061251 A1* | 3/2013 | Schwartz et al. | 719/320 |
| 2013/0159395 A1* | 6/2013 | Backholm et al. | 709/203 |
| 2013/0201970 A1* | 8/2013 | Fujita et al. | 370/336 |

OTHER PUBLICATIONS

U.S. Appl. No. 13/337,702, filed Dec. 27, 2011.

* cited by examiner

*Primary Examiner* — Qun Shen (57) ABSTRACT

A data processing system estimates hidden (off-net) wireless network users based on wireless communication network usage. The system processes wireless network usage data to estimate a first amount of frequent off-net users at a location in a time period based on past frequent on-net users who were at the location in past time periods at a rate above a frequent user threshold. The system processes the first amount and the wireless network usage data to estimate a second amount of infrequent off-net users at the location in the time period. The system process the first amount of the frequent off-net users and the second amount of the infrequent off-net users to estimate a total amount of off-net users at the location in the time period.

15 Claims, 6 Drawing Sheets

| PAST TIME PERIOD | FREQUENT USER | AT LOCATION & ON-NET | OFF-LOCATION & ON-NET |
|---|---|---|---|
| 1 | A | Y | N |
| | B | N | N |
| | C | N | Y |
| | ... | ... | ... |
| | N | Y | N |
| 2 | A | Y | N |
| | B | N | N |
| | C | Y | N |
| | ... | | |
| | N | N | Y |
| 3 | A | N | Y |
| | B | Y | N |
| | C | Y | N |
| | ... | | |
| | N | Y | Y |
| ... | | | |
| N | A | Y | N |
| | B | N | Y |
| | C | Y | N |
| | ... | | |
| | N | Y | Y |

HIDDEN WIRELESS USER ESTIMATION BASED ON WIRELESS NETWORK USAGE DATA

TECHNICAL BACKGROUND

Users operate wireless communication devices to communicate over wireless communication networks. The wireless communication networks generate usage data that characterizes these wireless communications. The usage data typically indicates the user devices, locations, and communication times among other items. The usage data is processed to determine the number of users at a given location at a given time by detecting their wireless transmissions at the given location at the given time. This usage data is also processed to identify frequent users at a given location and time by comparing their presence at the location to a frequent user threshold. The total population at the given location and time can also be determined by scaling the number of network users by a network penetration factor.

Unfortunately, some wireless network users may be present at the location during the time, but still remain hidden from the wireless network. The hidden wireless users typically do not have their wireless device, have turned the device off, have lost battery power, and the like. These hidden wireless network users decrease the accuracy of the user/population counts.

TECHNICAL OVERVIEW

A data processing system estimates user population based on wireless communication network usage. The system processes wireless network usage data to estimate a first amount of frequent hidden (off-net) users at a location in a time period based on past frequent on-net users. The past frequent on-net users were at the location in past time periods at a rate above a frequent user threshold. The system processes the first amount and the wireless network usage data to estimate a second amount of infrequent off-net users at the location in the time period. The system process the first amount of the frequent off-net users and the second amount of the infrequent off-net users to estimate a total amount of off-net users at the location in the time period.

DETAILED DESCRIPTION

Figure 1:
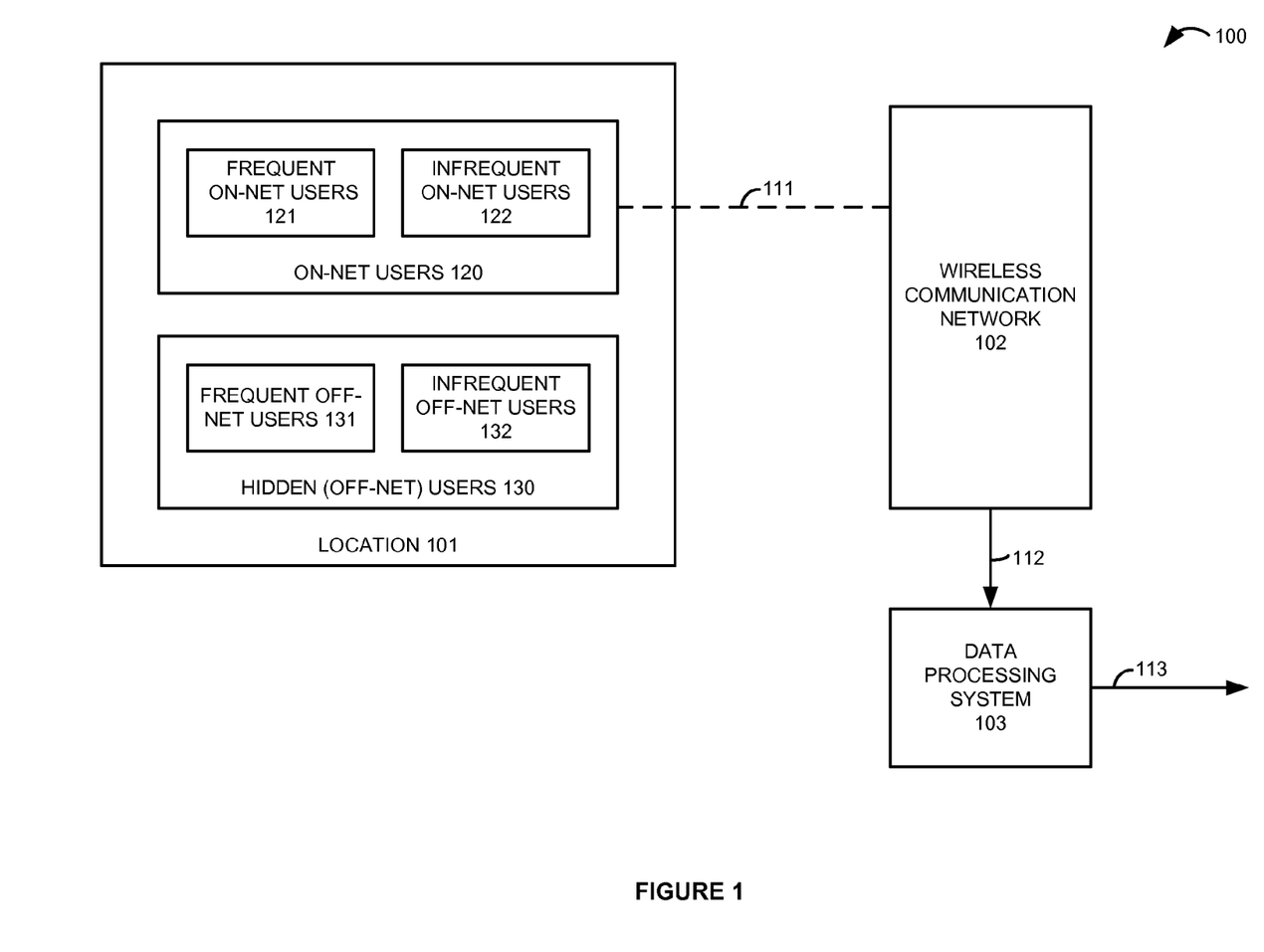
FIG. 1 illustrates a communication system that has a data processing system to generate population data based on wireless communication network usage data.

FIG. 1 illustrates communication system 100 that has data processing system 103 to generate population data 113 based on wireless communication network usage data 112. Communication system 100 comprises: location 101, wireless communication network 102, and data processing system 103. Location 101 could be a sector or coverage area in wireless communication network 102, although location 101 could also have other geographic boundaries, such as GPS coordinates, zip codes, user property lines, and the like. Wireless communication network 102 is representative of one or more such wireless networks.

During a time period of interest, on-net users 120 and hidden (off-net) users 130 are physically present within location 101. On-net users 120 operate wireless communication devices that transmit to wireless communication network 102 over wireless communication links 111. Some of these on-net wireless communication devices may be in idle-mode and only transmit idle-mode reports on a periodic basis.

On-net users 120 comprise frequent on-net users 121 and infrequent on-net users 122. Frequent on-net users 121 have a history of wireless communication usage at location 101 during past time periods that meets a frequent-user threshold. Infrequent on-net users 122 have a history (if any) of wireless communication usage at location 101 during past time periods that falls below the frequent-user threshold.

Off-net users 130 have a user-relationship with wireless communication network 102, but their wireless communication devices are not transmitting to wireless communication network 102 during the time period. The off-net users 130 are sometimes referred to as "hidden" wireless network users. Off-net users 130 have either turned their devices off, run out of battery, do not have their devices, or lack wireless transmissions for some other reason. For example, a user may configure their device to block transmissions in a receive-only mode that would be considered off-net and generally undetectable by wireless communication network 102.

Note that FIG. 1 illustrates the status of communication system 100 during a given time period of interest. Past time periods correspond to the time period of interest as follows. If the time period of interest is Monday morning, then the past time periods are past Monday mornings. If the time period of interest is Mother's Day, then past time periods may also include past Mother's Days. If the time period of interest is the last business day of the month, then past time periods may include the past last business days of the month. Various combinations and other data could be considered. As time passes, the frequency of users at location 101 and their on/off network status would likely change. Wireless network usage data 112 reflects these changes.

The wireless communication devices of network users 120 and 130 comprise phones, computers, media players, machine transceivers, and/or some other apparatus having wireless networking components. Wireless communication network 102 comprises computer and communication systems, such as base stations, access points, gateways, servers, signaling processors, backhaul systems, and the like. Data processing system 103 comprises a computer and communication system.

Wireless communication network 102 generates wireless network usage data 112 responsive to the wireless communications occurring over wireless communication links 111 and other portions of network 102. Wireless network usage data 112 comprises call detail records, idle-mode reports, registration records, user profiles, and/or other network data that characterizes the communications over wireless communication network 102.

Data processing system 103 processes wireless network usage data 112 to estimate the amount of frequent off-net users 131 at location 101 in the time period of interest. This estimate is based on the history of past frequent on-net users who were at location 101 in past time periods, but who were not detected for the time period of interest. In some examples, data processing system 103 processes wireless network usage data 112 to detect these past frequent users at location 101 by comparing their individual user records for location 101 during past time periods to a frequency threshold.

Data processing system 103 processes wireless network usage data 112 to estimate the amount of infrequent off-net users 132 at location 101 in the time period. Data processing system 103 processes the estimated amounts of frequent off-net users 131 and infrequent off-net 132 to estimate the total amount of off-net users 130 at location 101 in the time period. Population data 113 indicates the total amount of off-net users 130 at location 101 in the time period.

If desired, data processing system 103 aggregates the estimated amount of off-net users 130 with a detected amount of on-net users 120 to indicate a total amount of network users at location 101 in the time period. Data processing system 103 could scale this total amount of network users by a network penetration factor for wireless communication network 102 to determine a population count at location 101 in the time period. Population data 113 may then indicate the total amount of network users and/or the population count at location 101 in the time period.

Figure 2:
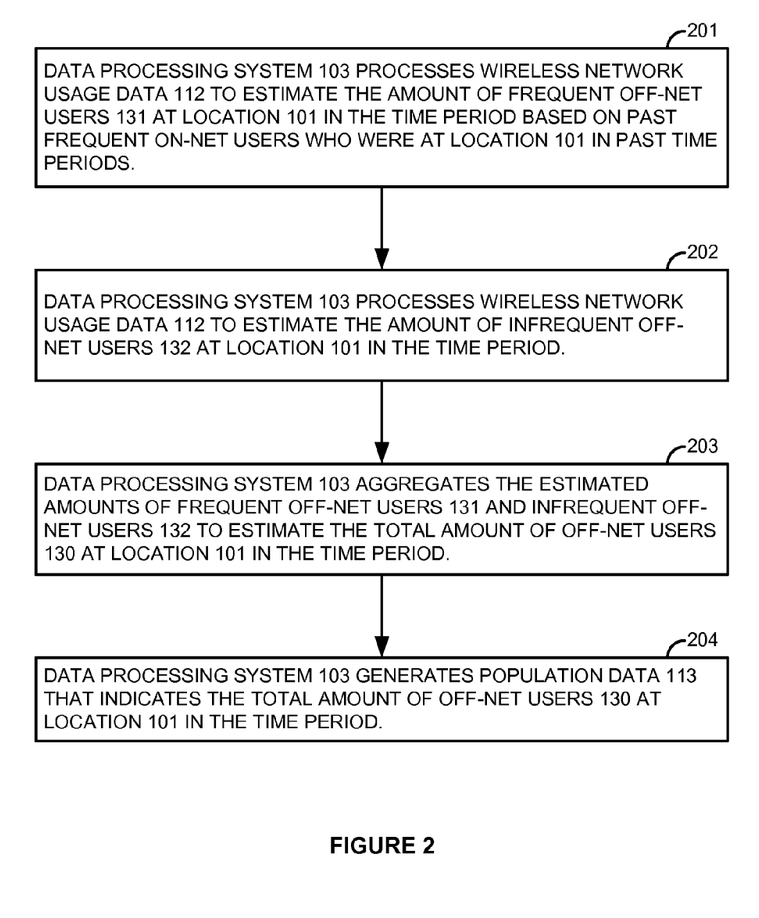
FIG. 2 illustrates the exemplary operation of a data processing system to generate population data based on wireless communication network usage data.

FIG. 2 illustrates an exemplary operation of data processing system 103 to generate population data 113 based on wireless communication network usage data 112. Data processing system 103 processes wireless network usage data 112 to estimate the amount of frequent off-net users 131 at location 101 in the time period (201). Frequent off-net users 131 have a history of wireless usage at location 101 in past time periods, but they are off-net for some reason during the time period of interest. The estimate of the frequent off-net users 131 is based on past frequent on-net users who were at location 101 in past time periods, but who are not detected during the time period of interest.

Data processing system 103 processes wireless network usage data 112 to estimate the amount of infrequent off-net users 132 at location 101 in the time period (202). Infrequent off-net users 132 do not have the history of frequent wireless usage at location 101 in past time periods, and they are off-net for some reason during the time period of interest. In some examples, this estimate of users 132 is based the estimate of frequent off-net users 131 and the observed amounts of frequent on-net users 121 and infrequent on-net users 122. The observed amounts of on-net users 120 are determined from their wireless network usage at location 101 during the time period as characterized in network usage data 112. The frequent/infrequent status of on-net users 120 is determined based on their wireless network usage at location 101 during past time periods as characterized in network usage data 112.

Data processing system 103 aggregates the estimated amounts of frequent off-net users 131 and infrequent off-net users 132 to estimate the total amount of off-net users 130 at location 101 in the time period (203). Data processing system 103 generates population data 113 that indicates the total amount of off-net users 130 at location 101 in the time period (204).

Figure 3:
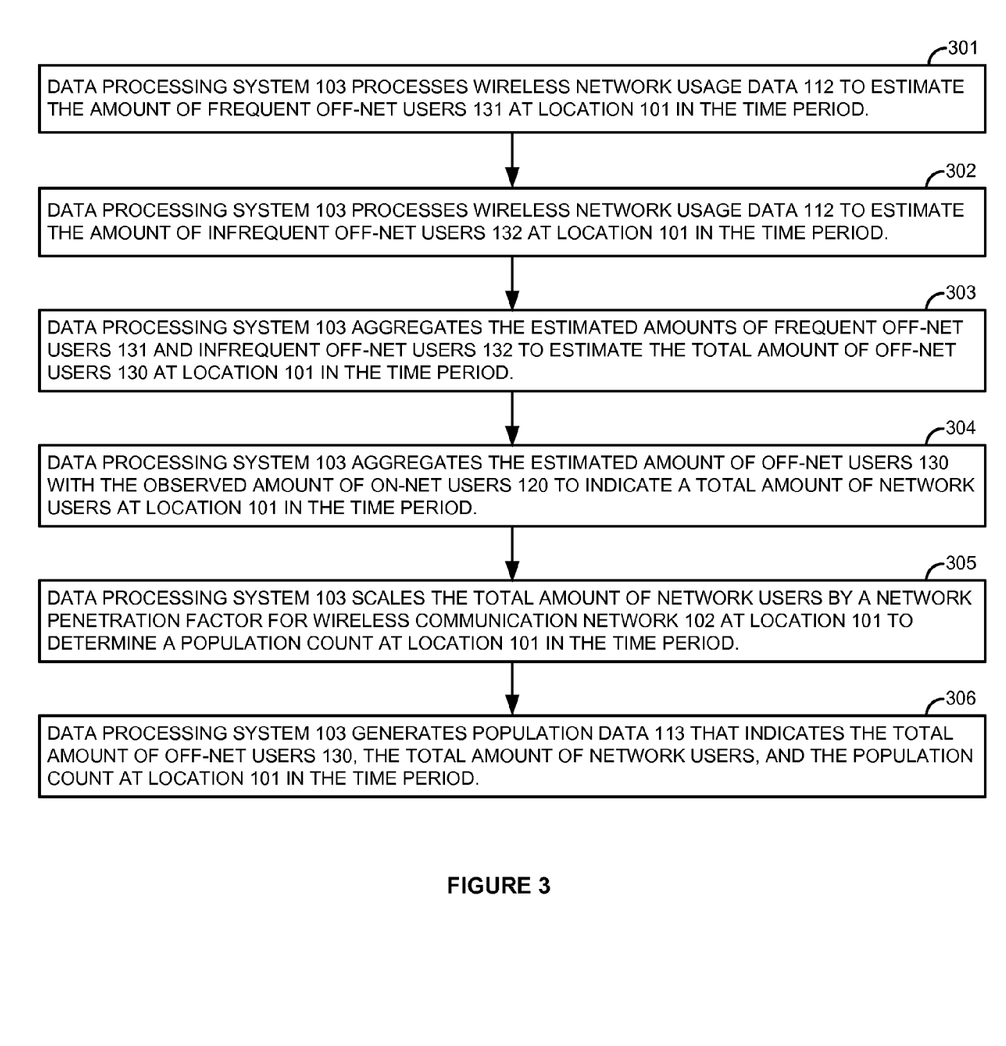
FIG. 3 illustrates the exemplary operation of a data processing system to generate population data based on wireless communication network usage data.

FIG. 3 illustrates an exemplary operation of data processing system 103 to generate population data 113 based on wireless communication network usage data 112. Data processing system 103 processes wireless network usage data 112 to estimate the amount of frequent off-net users 131 at location 101 in the time period (301). Data processing system 103 processes wireless network usage data 112 to estimate the amount of infrequent off-net users 132 at location 101 in the time period (302). In some examples, this estimate of infrequent off-net users 132 is based the estimate of frequent off-net users 131 multiplied by the observed ratio of infrequent on-net users 122 to frequent on-net users 121. The observed amounts of on-net users 120 are determined from their wireless network usage at location 101 during the time period as characterized in wireless network usage data 112. The frequent/infrequent status of on-net users 120 is determined from their wireless network usage at location 101 during past time periods as characterized in wireless network usage data 112.

Data processing system 103 aggregates the estimated amounts of frequent off-net users 131 and infrequent off-net users 132 to estimate the total amount of off-net users 130 at location 101 in the time period (303). Data processing system 103 aggregates the estimated amount of off-net users 130 with the observed amount of on-net users 120 to indicate a total amount of network users at location 101 in the time period (304).

Data processing system 103 scales the total amount of network users by a network penetration factor for wireless communication network 102 at location 101 to determine a population count at location 101 in the time period (305). The network penetration factor is based on market research and typically indicates the percentage of the total population in a geographic area (that includes location 101) that are also users of wireless communication network 102. Data processing system 103 generates population data 113 that indicates the total amount of off-net users 130, the total amount of network users, and the population count at location 101 in the time period (306).

Figure 4:
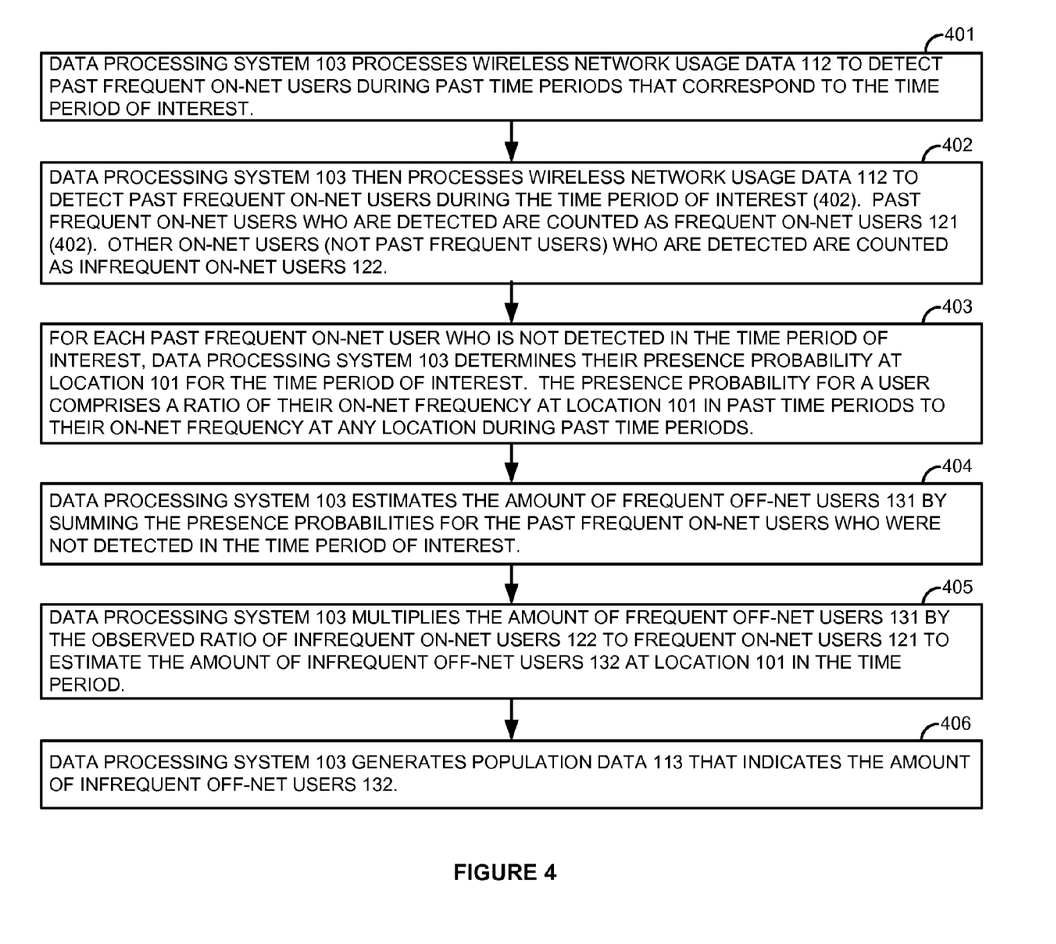
FIG. 4 illustrates the exemplary operation of a data processing system to determine the amount of infrequent off-net users based on wireless communication network usage data.

FIG. 4 illustrates an exemplary operation of data processing system 103 to determine the amount of infrequent off-net users 132 based on wireless communication network usage data 112. Infrequent off-net users 132 do not have a history of frequent wireless usage at location 101 in past time periods, and they are off-net for some reason during the time period of interest.

Data processing system 103 processes wireless network usage data 112 to detect past frequent on-net users during past time periods that correspond to the time period of interest (401). Typically, this detection entails comparing individual user wireless usage at location 101 during past time periods to a frequency threshold. Data processing system 103 then processes wireless network usage data 112 to detect past frequent on-net users during the time period of interest (402). Past frequent on-net users who are detected are counted as frequent on-net users 121 (402). Other on-net users who are not past frequent users but who are detected are counted as infrequent on-net users 122 (402).

For each past frequent on-net user who is not detected in the time period of interest, data processing system 103 determines their presence probability at location 101 for the time period of interest (403). The presence probability for a user comprises a ratio of their on-net frequency at location 101 in past time periods to their on-net frequency at any location during past time periods (403). For example, a user's presence probability for a location during a time period could comprise a ratio of their past presence in a sector serving the location to their past presence in any sector. Data processing system 103 estimates the amount of frequent off-net users 131 by summing the presence probabilities for the past frequent on-net users who were not detected in the time period of interest (404).

Data processing system 103 multiplies the amount of frequent off-net users 131 by the observed ratio of infrequent on-net users 122 to frequent on-net users 121 to estimate the amount of infrequent off-net users 132 at location 101 in the time period (405). The amounts of on-net users 120 are determined from their wireless network usage as characterized in wireless network usage data 112. The frequent/infrequent status of on-net users 120 is determined based on past wireless network usage as characterized in wireless network usage data 112. Data processing system 103 generates population data 113 that indicates the amount of infrequent off-net users 132 (406).

Figure 5:
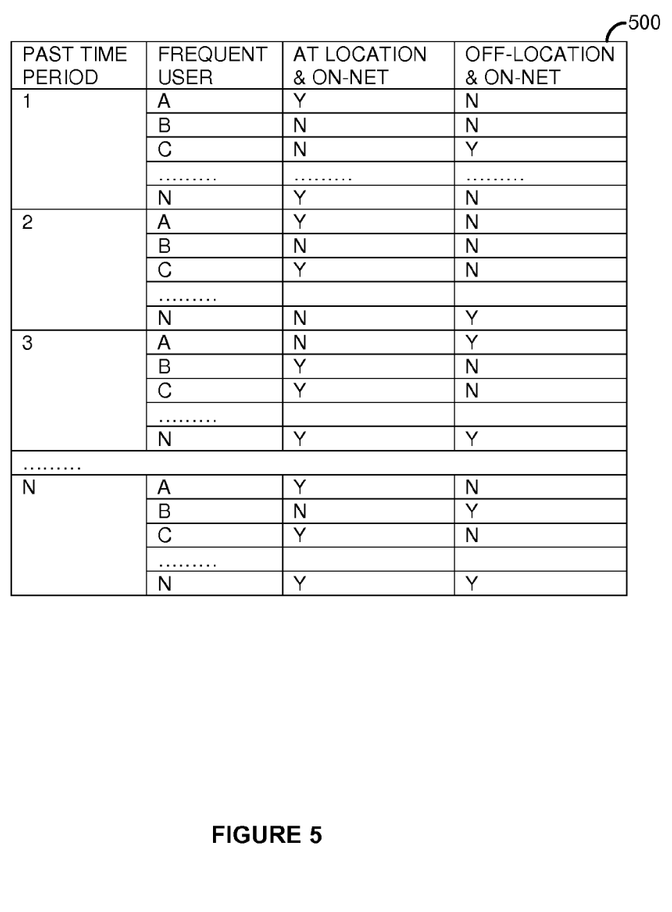
FIG. 5 illustrates a data structure that shows presence probability data for a given location and time period.

FIG. 5 illustrates data structure 500 that shows presence probability data for a given location. The first column indicates a sequence of time periods 1-N, such as a sequence of twelve Mondays from 10-11 A.M. The second column indicates frequent users for the time periods as detected by their wireless usage at the location during the pertinent time periods. The third column tracks the presence of the frequent users at the location during the time periods through the detection of their wireless transmissions. The fourth column tracks presence of the frequent users at other network locations during the time periods through the detection of their wireless transmissions at these other locations.

By tracking a suitable number of past time periods, individual presence probabilities for many frequent users can be developed for the location and time period of interest. The individual presence probabilities may comprise the sum of past time periods with their presence detected at the location divided by the sum of past time periods with their presence detected at any network location. To estimate the off-net frequent users for a location and time period of interest, the presence probabilities for the non-observed frequent users are summed. Thus, the past frequent users who are detected in the time period of interest are counted as on-net frequent users, and the past frequent users who not detected in the time period of interest are counted—to the extent of their presence probability—as off-net frequent users for the location and time period of interest.

Figure 6:
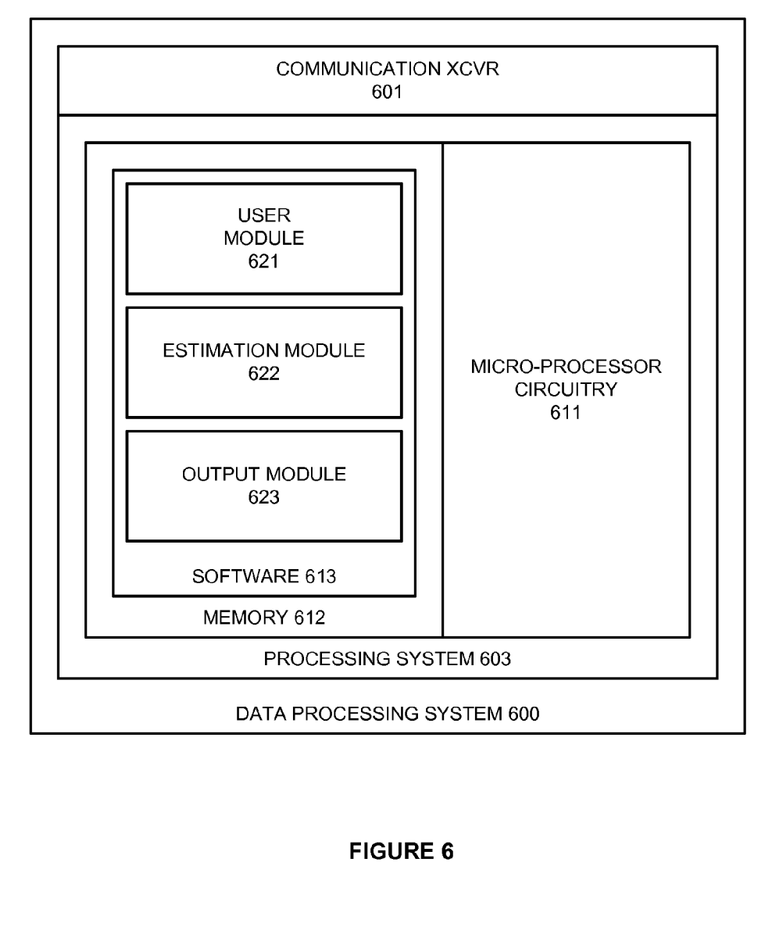
FIG. 6 illustrates an exemplary data processing system to generate population data based on wireless communication network usage data.

FIG. 6 illustrates data processing system 600. Data processing system 600 is an example of the data processing system 103, although system 103 may use alternative configurations. Data processing system 600 comprises communication transceivers 601 and processing system 603. Processing system 603 comprises micro-processing circuitry 611 and memory 612. Memory 612 stores software 613. Data processing system 600 may be integrated into a single platform or may be distributed across multiple diverse computer and communication systems. Some conventional aspects of data processing system 600 are omitted for clarity, such as power supplies, enclosures, and the like.

Communication transceivers 601 comprise communication components, such as ports, circuitry, memory, software, and the like. Communication transceivers 601 typically utilize Ethernet, Internet, or some other networking protocol suitable for network information systems—including combinations thereof.

Micro-processor circuitry 611 comprises circuit boards that hold integrated circuitry and associated electronics. Memory 612 comprises non-transitory, computer-readable, data storage media, such as flash drives, disc drives, and the like. Software 613 comprises computer-readable instructions that control the operation of micro-processor circuitry 611 when executed. Software 613 includes modules 621-623 and may also include operating systems, applications, utilities, databases, and the like. Micro-processor circuitry 611 and memory 612 may be integrated into a single computer system or may be distributed across multiple computer systems. All or portions of software 613 may be externally stored on flash drives, discs, servers, and the like.

When executed by circuitry 611, user module 621 directs circuitry 611 to process network data to detect users and determine frequent users and presence probabilities as described herein. When executed by circuitry 611, estimation module 622 directs circuitry 611 to process the network data, frequent users, and presence probabilities to determine the amount of frequent off-net users and the amount of infrequent off-net users as described herein. When executed by circuitry 611, output module 623 directs circuitry 611 to generate and transfer data indicating off-net users, on-net users, total network users, and scaled population estimates as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data processing system to estimate user population based on wireless communication network usage, the method comprising:
   in a communication interface, receiving wireless network usage data;
   in a processing system, processing the wireless network usage data to estimate an amount of on-net users at a location in a time period who were at the location in past time periods, wherein the amount of on-net users comprise an amount of frequent on-net users having wireless network usage above a threshold and an amount of infrequent on-net users having wireless network usage below the threshold;
   in the processing system, processing the wireless network usage data and the amount of on-net users at the location in the time period who were at the location in the past time periods to estimate an amount of frequent off-net users at the location in a time period;
   in the processing system, processing the amount of frequent off-net users and the wireless network usage data to estimate an amount of infrequent off-net users at the location in the time period; and
   in the processing system, processing the amount of the frequent off-net users and the amount of the infrequent off-net users to estimate a total amount of off-net users at the location in the time period.

2. The method of claim 1 wherein processing the wireless network usage data to estimate the amount of off-net users at the location in the time period who were at the location in past time periods comprises determining presence probabilities at the location in the time period for at least some of the past on-net users.

3. The method of claim 2 wherein processing the wireless network usage data to estimate the amount of off-net users at the location in the time period who were at the location in past time periods comprises aggregating the presence probabilities.

4. The method of claim 1 wherein processing the amount of frequent off-net users and the wireless network usage data to estimate the amount of infrequent off-net users at the location in the time period comprises multiplying the amount of frequent off-net users by a ratio of the amount of infrequent on-net users to the amount of frequent on-net users.

5. The method of claim 1 wherein processing the wireless network usage data to estimate the amount of frequent off-net users comprises determining the amount of frequent on-net users who were at the location in the past time periods with past wireless network usage data above the threshold.

6. The method of claim 1 further comprising aggregating the total amount of the off-net users at the location in the time period with an additional amount of on-net users at the location in the time period to indicate a total amount of network users at the location in the time period.

7. The method of claim 6 further comprising scaling the total amount of network users at the location in the time period by a network penetration factor to determine a population at the location in the time period.

8. A computer apparatus to direct a data processing system to estimate user population based on wireless communication network usage, the computer apparatus comprising:
   a processor; and
   one or more non-transitory computer readable media coupled to the processor storing instructions that when executed by the processor cause the apparatus to:
      to process wireless network usage data to estimate an amount of on-net users at a location in a time period who were at the location in past time periods, wherein the amount of on-net users comprise an amount of frequent on-net users having wireless network usage above a threshold and an amount of infrequent on-net users having wireless network usage below the threshold;
      to process the wireless network usage data and the amount of on-net users at the location in the time period who were at the location in the past time periods to estimate an amount of frequent off-net users at the location in the time period;
      to process the amount of frequent off-net users and the wireless network usage data to estimate an amount of infrequent off-net users at the location in the time period; and
      to process the amount of the frequent off-net users and the amount of the infrequent off-net users to estimate a total amount of off-net users at the location in the time period.

9. The computer apparatus of claim 8 wherein the data processing software is configured to direct the data processing system to determine presence probabilities at the location in the time period for at least some of the past on-net users.

10. The computer apparatus of claim 9 wherein the data processing software is configured to direct the data processing system to aggregate the presence probabilities.

11. The computer apparatus of claim 10 wherein the data processing software is configured to direct the data processing system to determine if the past on-net users were on-net at the location in the past time periods or were on-net and off-location in the past time periods.

12. The computer apparatus of claim 8 wherein the data processing software is configured to direct the data processing system to multiply the amount of frequent off-net users by a ratio of the amount of infrequent on-net users to the amount of frequent on-net users.

13. The computer apparatus of claim 8 wherein the data processing software is configured to direct the data processing system to determine the past on-net users who were at the location in the past time periods with the past wireless network usage data above the threshold.

14. The computer apparatus of claim 8 wherein the data processing software is configured to direct the data processing system to aggregate the total amount of the off-net users at the location in the time period with an additional amount of on-net users at the location in the time period to indicate a total amount of network users at the location in the time period.

15. The computer apparatus of claim 14 wherein the data processing software is configured to direct the data processing system to scale the total amount of network users at the location in the time period by a network penetration factor to determine a population at the location in the time period.

* * * * *